Dec. 25, 1945. J. H. WOODALL 2,391,814
MACHINE FOR MAKING CUSHIONS
Filed Nov. 21, 1942 5 Sheets-Sheet 3

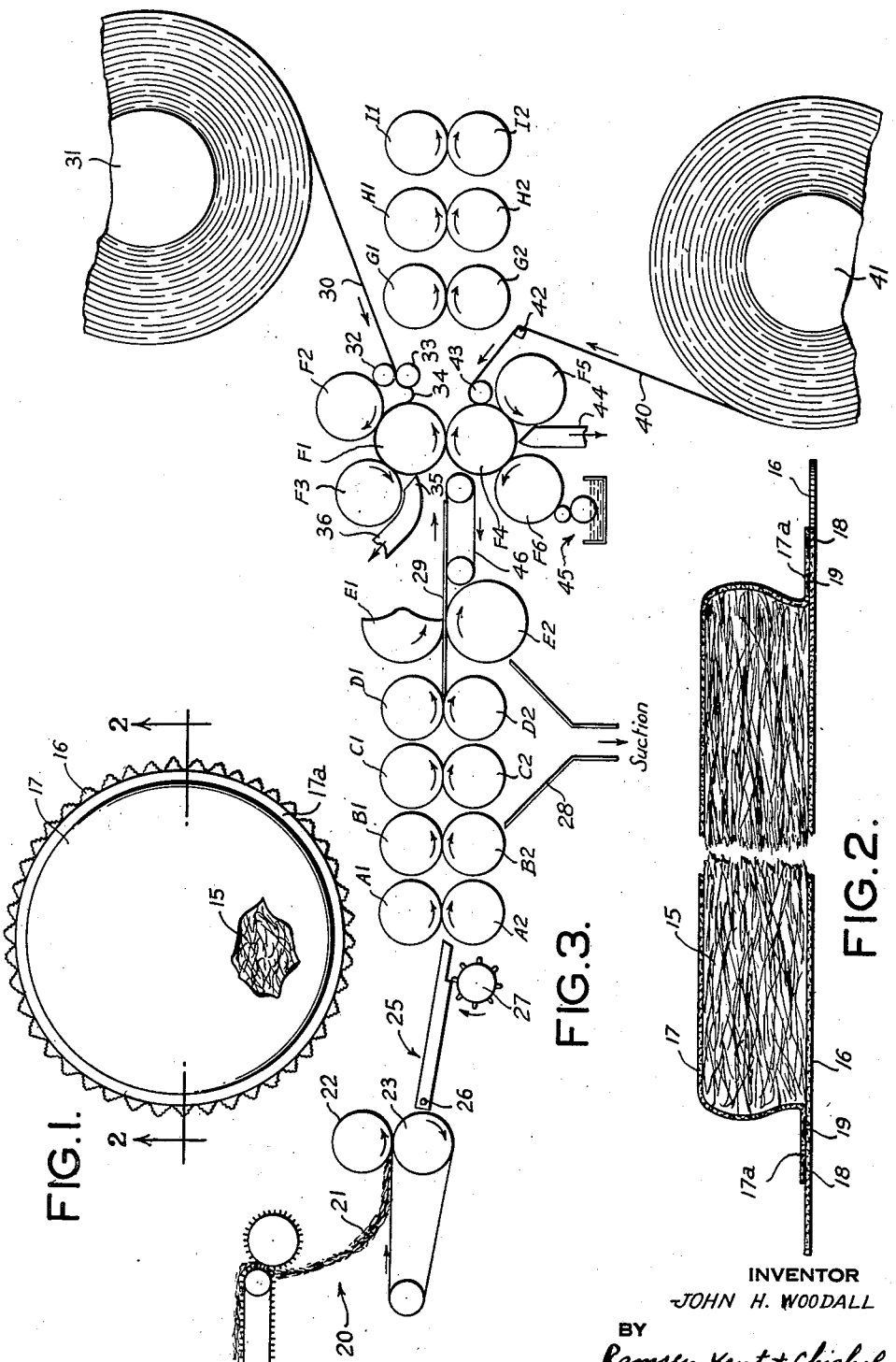

INVENTOR
JOHN H. WOODALL
BY
Ramsey, Kent & Chisholm
ATTORNEYS

Patented Dec. 25, 1945

2,391,814

UNITED STATES PATENT OFFICE 2,391,814

MACHINE FOR MAKING CUSHIONS

John H. Woodall, Woodland, Ga.

Application November 21, 1942, Serial No. 466,499

15 Claims. (Cl. 154—29)

This invention relates to machines for making cushions, a cushion usually consisting of a pad of cushion material enclosed in an envelope of sheet material. These cushions are widely used for packing purposes. In packing fruit in baskets, a circular cushion is placed between the cover of the basket and the pack of fruit. The invention will be disclosed as applied to a machine for making circular basket cushions.

I prefer to make the cushioning pad of a fine strand excelsior known as wood wool. However, the pad may be made of any suitable material, e. g., hay, straw, fibrous materials of various sorts, etc.

An object of the present invention is to provide a machine for cutting out cushioning pads, cutting out envelope parts, and assembling the component parts into cushions.

Another object of the invention is to provide a machine utilizing continuously driven rollers to cut out and assemble the parts for packing cushions, especially circular basket cushions.

An additional object of the invention is to provide a machine for making cushions, especially circular cushions, which reduces the scrap materials to a minimum and leaves the scrap in condition for reworking.

A further object of the invention is to provide a machine which produces circular basket cushions economically and rapidly on a continuous basis without hand operations.

Various specific objects of the invention will be apparent from the following disclosure.

Fig. 1 of the drawings is a plan view of a basket cushion made by a machine of the present invention. Part of the envelope is broken away to show the cushioning pad.

Fig. 2 is a section, on a larger scale, taken on the line 2—2 of Fig. 1.

Fig. 3 is a diagrammatic elevational view of a machine for making the cushion.

Figure 4:
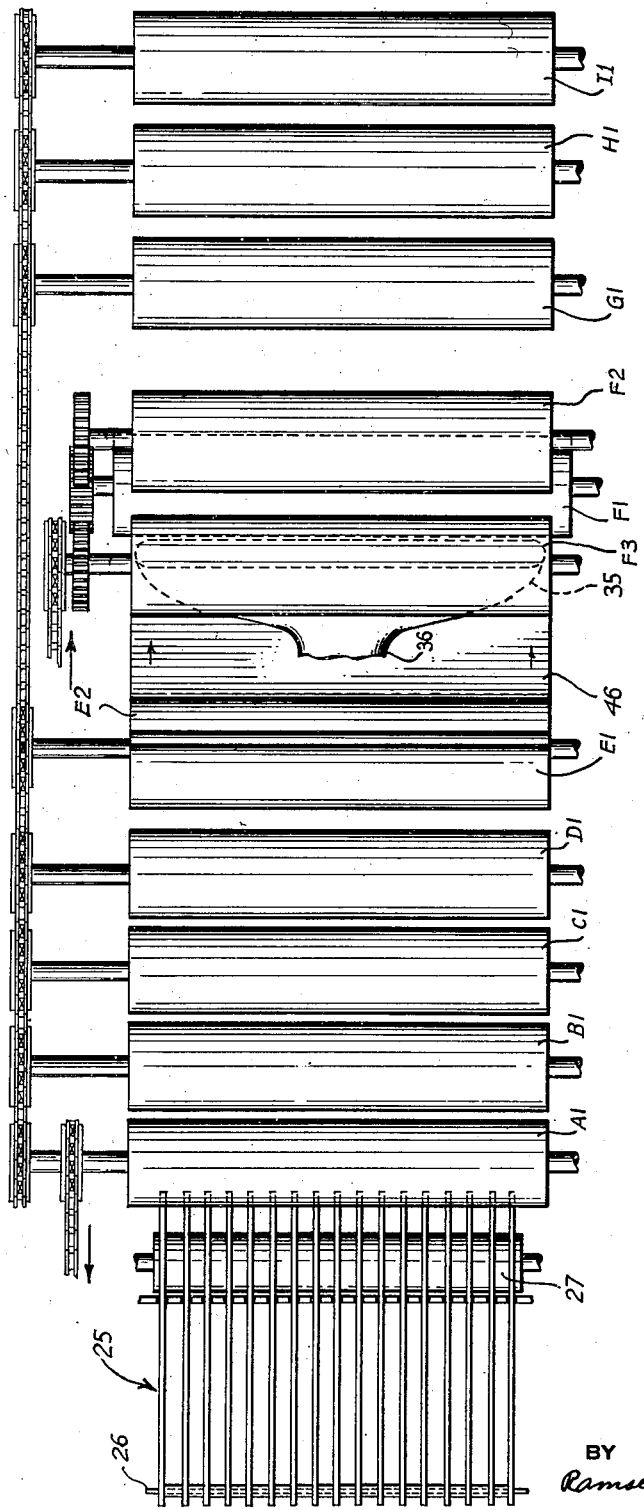
Fig. 4 is a diagrammatic plan view of the machine.

Reference will first be had to Figs. 1 and 2. A circular pad of cushion material 15 (I prefer wood wool) is enclosed within an envelope made up of two discs of sheet material 16 and 17. The disc 16 is flat and has a serrated decorative edge as shown in Fig. 1. This disc is preferably made of light cardboard. The disc 17 is cupped or hat-shaped and may be made of quite light weight paper. The brim 17a of the hat-shaped formation is in face-to-face contact with an outer annular zone of the disc 16 and is secured thereto by two annular zones of gluing 18 and 19. It will be seen that the cushion consists of a cushioning pad enclosed within an envelope of sheet material. The envelope is made of two envelope-forming discs having their outer edge portions in face-to-face contact and glued together, with the result that the cushion is provided with a laminated projecting rim.

Reference will now be had to Figs. 3 and 4. A known type of carding machine designated as a whole by 20 produces a continuous web of batting 21 of wood wool (or other material) and delivers it continuously through compression rolls 22 and 23. The web of batting passes to an inclined rack 25 which is of grill formation, as best seen in Fig. 4. This rack 25 is pivoted at 26 and is adapted to be vigorously vibrated up and down through the action of a so-called "spiked" drum 27. Through this vigorous up and down motion, trash and loose pieces of material that may be entrained in the web of batting 21 are shaken out and fall through the grill.

From vibrating rack 25 the web of batting passes between compression rollers A1 and A2 and then between rollers B1 and B2. Roller B1 is a cutting roll (see Fig. 5) operating substantially against backing means consisting of a plain roller B2, and roller B1 cuts a series of closely spaced or tangent discs of cushion material from the web of batting. The discs or pads of cushion material then pass between rollers C1 and C2 for recompression. Thereafter the pads pass between rollers D1 and D2, which are duplicates of rollers B1 and B2, respectively. Roller D1 acts as a trimming roller which trims off any raw edges or projecting strands that may be on the previously cut cushion pad. The waste material from the initial cutting by roller B1 and the trimming by roller D1 falls by gravity between the rollers into a hopper 28, from which it is carried away by suction and subsequently reused in the carding machine 20.

From rollers D1 and D2 the cut and trimmed pads pass to spacing rollers E1 and E2 which separate the successive pads, i. e., increase the space between the successive pads. The effective peripheral speed of rollers A1, A2, B1, B2, C1, C2, D1, and D2, is the same in each instance. However, the rollers E1 and E2 are greater in radius and the peripheral speed of rollers E1 and E2 is accordingly greater than that of the preceding rollers. Roller E1 is formed with a blank space in its periphery, with the result that rollers E1 and E2 taken together produce periods of feed separated by non-feeding periods. As the pads, one of which is indicated at 29, are projected by rollers D1 and D2 to rollers E1 and E2, roller E1 is in such position that the forward portion of the pad is merely pushed over the top surface of roller E2, there being at that time no feeding action between rollers E1 and E2. Just as the rear edge of the pad is released by the rollers D1 and D2, roller E1 comes into feeding relationship with roller E2 so that the pad is fed forwardly by rollers E1 and E2 at the increased peripheral speed of rollers E1 and E2. Thus, each pad is speeded up by spacing rollers E1 and E2, with the result that the succession of pads are separated, or in other words, the space between successive pads is increased. After leaving rollers E1 and E2, the pads, and eventually the assembled cushions, are continued through the machine at the linear speed established by rollers F1 and F4.

Figure 9:
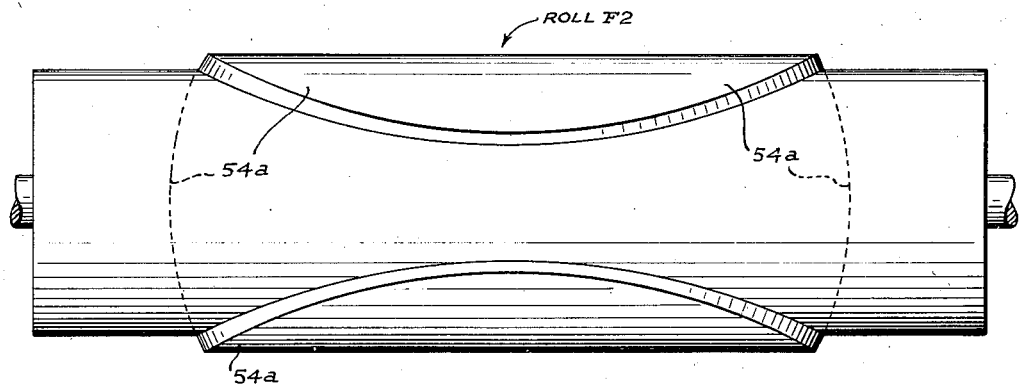
Fig. 9 is a partly diagrammatic elevation of a cupping roller which cups the paper that is used for part of the cushion envelope.
Figure 10:
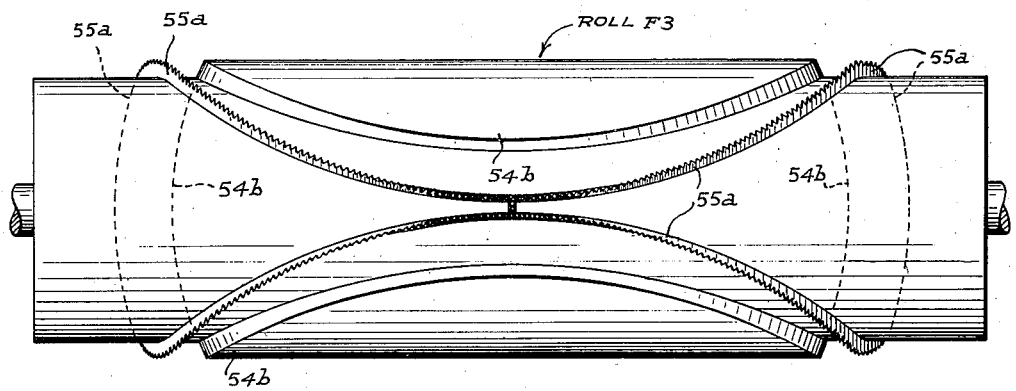
Fig. 10 is a partly diagrammatic elevation of a cutting roller that cuts out the cupped paper part.

A web 30 of light weight paper is drawn from spool 31 by feed rollers 32 and 33. Preferably a loop-controlled mechanism (not shown) is used to automatically control the speed of rollers 32 and 33 and thereby maintain a suitable loop of paper at 34. Such loop-controlled mechanisms are well known and are customarily used to control the feed of paper webs. The web of paper 30 passes between rollers F1 (see also Fig. 6) and F2 (see also Fig. 9) where cup formations are impressed successively in the web preliminary to cutting out the envelope forming discs 17 (Fig. 2). The blanks 17 are then cut out successively by cutting roller F3 (see also Fig. 10) operating against roller F1 as its backing means, each blank being held by suction to roller F1 until assembled into a cushion. Scrap paper from the cutting operation is sucked into funnel 35 and drawn off through exhaust pipe 36.

Figure 11:
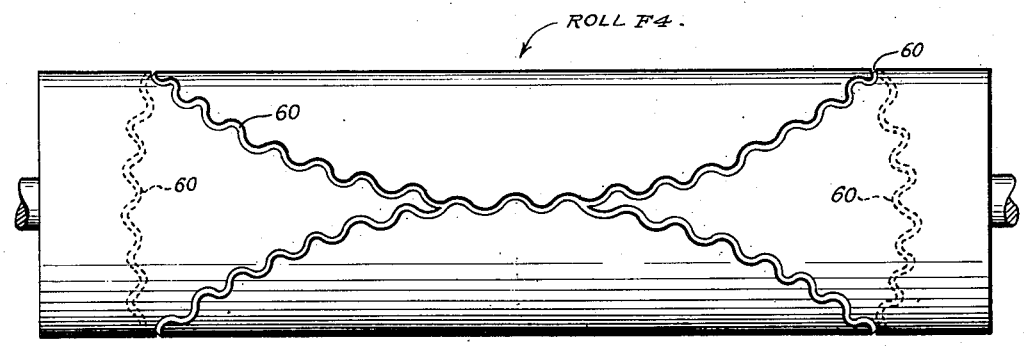
Fig. 11 is a partly diagrammatic elevation of the second assembly roller, which cooperates with the roll of Fig. 6 in assembling the cushion.

A web of light cardboard 40 is drawn from spool 41 over a stationary corner at 42, the web being pulled by the action of feed roller 43 working in conjunction with roller F4 (see also Fig. 11). A cutting roller F5 (see also Fig. 12) operating against roller F4 as its backing means cuts successive serrated envelope discs 16 from the web of cardboard. The scrap from the cutting operation is sucked into a funnel and carried off through exhaust pipe 44. Each cut out disc 16 is held by suction to roller F4 until assembled into a cushion. To provide the suction, roller F4 may be a perforated hollow roller connected with suction lines. In the alternative, roller F4 may be provided with small rubber suction cups to hold the cut out disc 16 on the roller. Roller F6 (see also Fig. 13) receives glue from a suitable applicator indicated diagrammatically at 45 and applies to each cut out disc of cardboard the two concentric circles of glue which are to form the glue zones 18 and 19 (Fig. 2).

The cushioning pads delivered by rollers E1 and E2 pass in timed relation to rollers F1 and F4, being assisted on their way by a belt conveyor 46. As a cupped disc of paper 17 is brought around by roller F1 a companion cardboard disc 16 is brought around by roller F4 with the glue already applied to the cardboard. A cushion pad 29 is delivered between the two envelope-forming member 16 and 17, and rollers F1 and F4 apply pressure to the rim zone 17a, thereby forming the cushion shown in Figs. 1 and 2. The rollers F1 and F4 I designate as the "master rolls" of the machine. From rollers F1 and F4 the cushions pass directly to sealing and drying rollers which maintain pressure upon the zone 17a until the glue has dried sufficiently. Any necessary or desired number of pairs of sealing and drying rollers may be used. By way of illustration I have shown three pairs of such rollers designated as G1 and G2, H1 and H2, and I1 and I2, though sometimes I may use only two pairs of sealing and drying rollers. From rollers I1 and I2 the completed cushions may pass to a discharge belt conveyor (not shown) which removes them from the machine.

The journals of rollers A1, C1, E1, G1, H1 and I1 may be biased by adjustable spring pressure toward their respective companion rollers. The journals of rollers B1, D1, F2, F3, F5, and F6 may be rigidly adjustable toward their respective companion rollers; and the journals of roller F1 may be likewise adjustable with respect to roller F4. The various rollers are all positively driven in coordinated relationship by suitable gearing and drive chains such as depicted in association with the top series of rollers illustrated in Fig. 4.

Figure 5:
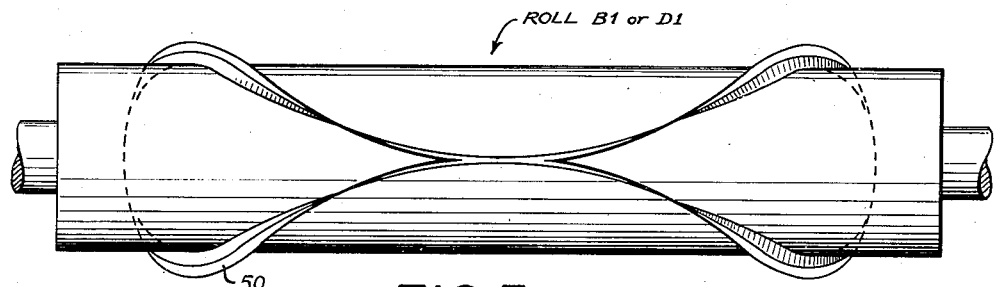
Fig. 5 is a partly diagrammatic elevation of one of two duplicate cutting rollers which cut and trim the cushioning pad.

Referring to Fig. 5, it will be seen that rollers B1 and D1 each carry a cutting knife 50 of such configuration that as batting passes under the roller, circular pads are cut or trimmed as the case may be. The companion rollers B2 and D2 are plain iron rollers which serve as backing means for rollers B1 and D1, respectively, and the adjustment is such that knives 50 move exceedingly close to, but not against, the surface of the rollers B2 and D2. To insure a clean cut of the batting, the operating clearance between knives 50 and the rollers B2 and D2 should be something after the order of .001 inch.

Figure 6:
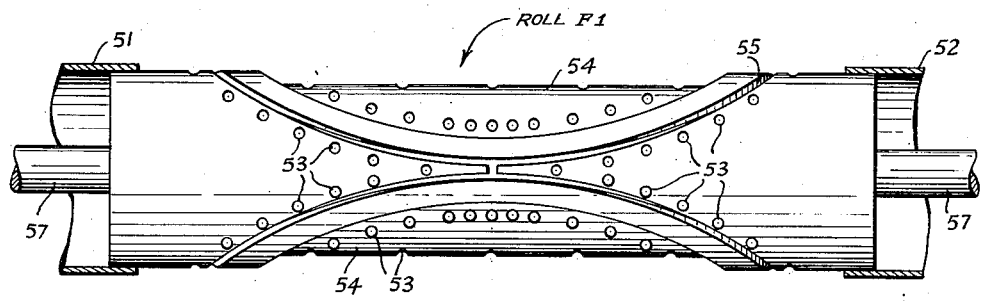
Fig. 6 is primarily a partly diagrammatic elevation of one of two assembly rollers which cooperate in assembling the parts of the cushions.
Figure 7:
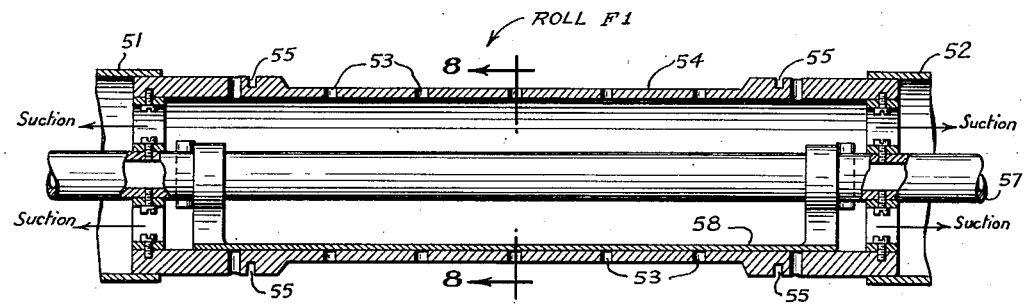
Fig. 7 is a partly diagrammatic section taken in general on line 7—7 of Fig. 8.
Figure 8:
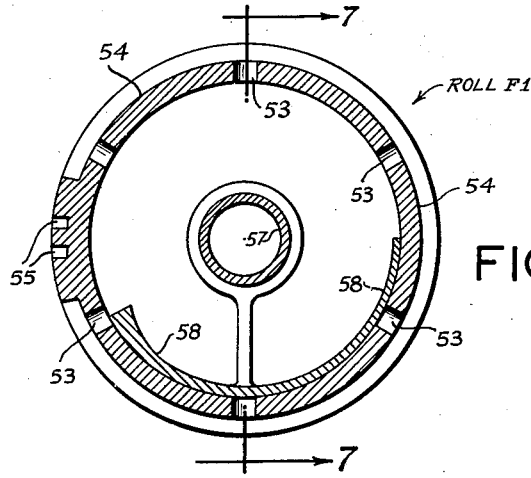
Fig. 8 is a partly diagrammatic cross-section taken on the line 8—8 of Fig. 7.

Roller F1 is shown in more detail in Figs. 6, 7, and 8. This is a hollow perforated roller having suction applied to both ends from stationary suction heads 51 and 52 which may be sufficiently sealed to the roller by any suitable sealing strips (not shown). The roller is provided with quite a number of perforations such as indicated at 53. The surface of the roller is provided with a depressed zone 54 of such shape that, when developed into a plane, it becomes a circle. Spaced from depressed zone 54 is a groove 55 which is likewise of such configuration that, when developed into a plane, it becomes a circle. Roller F2 (see also Fig. 9) is provided with a raised rubber plunger member 54a which is complementary to and enters the depressed zone 54 of roller F1. This roller F2 acts as a cupping roll and depresses cup formations into the web 30 of paper. Roller F3 (see also Fig. 10) has a raised rubber plunger member 54b which is the same as 54a. Roller F3 has, in addition, a serrated cutting knife 55a which enters the groove 55 in roll F1 serving as the backing means for cutting roller F3, and cuts out the cupped blank 17 shown in Fig. 2. This blank is held by suction to roll F1 and carried forward to the cushion-assembly point.

Depending from the drive shaft 57 of roller F1 is an arcuate guard 58 which may be held by gravity, or by positive mechanical means, in the position shown in Fig. 8. As the cut out blank 17 is brought to the cushion-assembly point by roll F1, the holes 53 pass successively under the guard 58, thereby relieving the suction from the paper blank 17 and allowing it to be stripped from roll F1 during the cushion-assembly operation. If desired felt sealing strips, or the like, may be used between arcuate guard 58 and the inner surface of roll F1.

If desired a similar arrangement can be used in connection with roll F4 to facilitate stripping of cardboard disc 16 from that roll. However, the cardboard is usually sufficiently heavy to permit it to be stripped from roll F4 at the cushion-assembly point without any special arrangement to facilitate the stripping.

Figure 12:
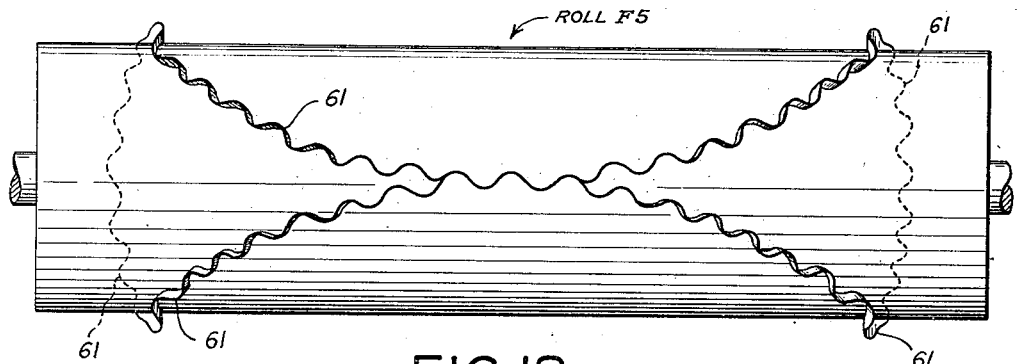
Fig. 12 is a partly diagrammatic elevation of a cutting roller which cuts out a cardboard disc that enters into the cushion envelope.
Figure 13:
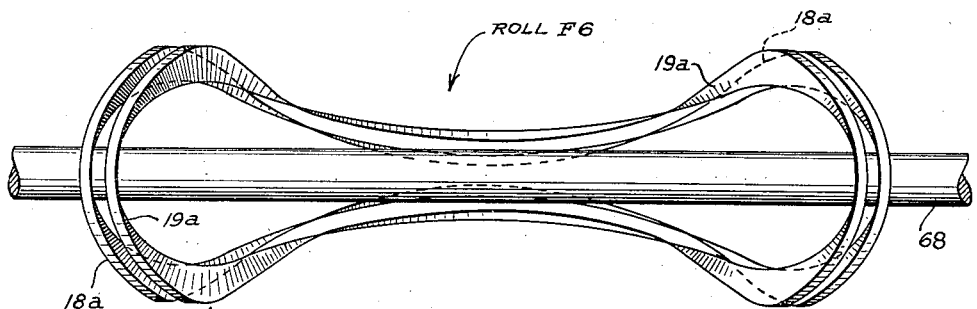
Fig. 13 is a partly diagrammatic elevation of a roller which applies glue to the cardboard disc.

Referring to Figs. 11 and 12, it will be seen that roll F4 is provided with a serpentine groove 60 and that roll F5 is provided with a corresponding serpentine knife 61 which enters the groove. The layout of the groove and knife are such as to cut out the serrated cardboard disc 16 shown in Figs. 1 and 2.

Roll F6 (Fig. 13) is a skeleton roll having surface portions 18a and 19a which are attached to and driven by shaft 68. Surface portions 18a and 19a lie in the surface of a cylinder and are of such configuration as to print the glue circles 18 and 19 respectively.

Figure 14:
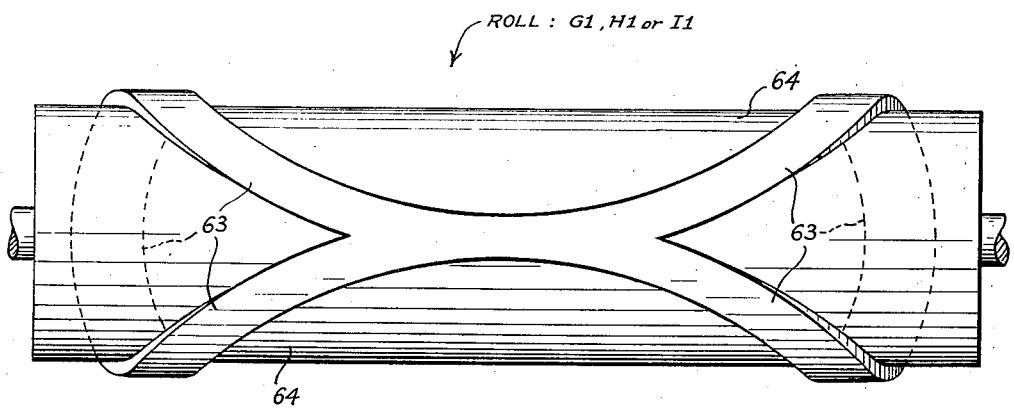
Fig. 14 is a partly diagrammatic elevation of one of duplicate, or triplicate, pressure rollers which apply sealing pressure to the assembled cushion.

Reference will now be had to Fig. 14. Rolls G1, H1, and I1 have a raised band-like zone 63, which when developed into a plane, corresponds to the zone 17a of the cushion. These raised zones 63, rolling in opposition to plain cylindrical rollers G2, H2 and I2, maintain sealing pressure upon the rim zone 17a of the assembled cushion. During this time, the depressed zone provided at 64 receives the center or thick part of the cushion.

It will be seen that the machine of the present invention cuts out cushioning pads on a continuous basis, cuts out envelope components on a continuous basis, and assembles the cushion pads between the envelope components, sandwich position, successively producing cushions on a continuous basis, all without hand operations. A source of cushion material is provided by the carding machine 20 and the mechanism between it and rolls A1, A2. A source of sheet material for the envelopes is provided by spools 31 and 41, considered jointly and severally.

Each of the rollers A1, B1, C1, D1, E1, F1, G1, H1, and I1 performs with the assistance of backing means constituted, in the illustrated machine, by surfaces of the respectively adjacent rollers A2, B2, C2, D2, E2, F4, G2, H2 and I2. In similar fashion, the roller F1 serves the function of backing means for the roller F2 and the roller F3; and the roller F4 serves the function of backing means for the roller F5 and the roller F6.

In compliance with the patent statutes I have disclosed the best form in which I have contemplated applying my invention, but it will be realized that the disclosure is illustrative and does not limit the scope of the invention.

I claim:

1. A machine for making cushions, comprising: means for supplying resilient compressible stock, means for successively producing cushion pads of definite shape and area from said stock, means for supplying sheet material, means operated in coordination with said pad-producing means for cutting successive envelope components of greater area than pad area from the sheet material at the same rate as the rate of pad production, means for applying envelope components individually to the successively-produced pads on opposite faces thereof, and means for uniting said thus-pad-associated envelope components to complete fabrication of padded cushions therefrom.

2. A machine for making cushions, comprising: means for supplying resilient compressible stock, means for successively producing cushion pads of definite shape and area from said stock, means for supplying sheet material, means operated in coordination with said pad-producing means for cutting successive envelope components of greater area than pad area from the sheet material at the same rate as the rate of pad production, means for applying envelope components individually to the successively-produced pads on opposite faces thereof, means for successively applying adhesive to envelope components beyond their area of direct association with their respective pads, and means for applying uniting pressure to said adhesive-applied, pad-associated, envelope components to complete fabrication of padded cushions therefrom.

3. A machine for making cushions, comprising: means for supplying resilient compressible stock, means for successively producing cushion pads of definite shape and area from said stock, means for supplying sheet material, means operated in coordination with said pad-producing means for cutting successive paired envelope components of greater envelope than pad area from the sheet material at the same rate per pair as the rate of pad production, means for applying envelope component pairs to the successively produced pads with said paired components in a definite predetermined overextending sandwiching association therewith, and means for successively uniting the pad-interposing pairs of envelope components beyond the margins of their respective pads to complete fabrication of padded cushions therefrom.

4. A machine for making cushions, comprising: means for supplying excelsior, means for successively producing cushion pads of definite shape and area from said excelsior, means for supplying cardboard, means operated in coordination with said pad-producing means for cutting successive greater-than-pad-size plates from said cardboard at a rate corresponding to the rate of pad production, means for supplying paper, means for cutting successive greater-than-pad size paper covers from said paper at a rate corresponding to the rate of pad production, and means for applying and uniting one cardboard plate and one paper cover upon each successively-produced pad with said plate and cover jointly constituting a flanged envelope encasing each successive pad.

5. A machine for making cushions, comprising: means for supplying a web of cushion material, a cutting roll with backing means therefor operative when driven to cut successive pads from said web of cushion material, a trimming roll with backing means therefor operatively driven in coordination with said cutting roll to trim pads successively delivered from said cutting roll, means for supplying two webs of sheet material, cutting rolls with backing means operatively driven in coordination with said first cutting roll to cut successive pairs of envelope components from said two webs of sheet material at the same rate per pair as the cutting rate for individual pads, and means driven in coordination with said several rolls for successively permanently assembling each said trimmed pad between each successive pair of envelope components to constitute therewith a padded cushion.

6. A machine for making basket cushions, comprising: means for supplying excelsior batting in an unbroken web, a first cutting roll with backing means therefor operative when driven to cut successive disc-like pads from the batting, a trimming roll with backing means therefor operatively driven in coordination with said cutting roll to trim pads successively delivered from said cutting roll, means for supplying cardboard in an unbroken web, a second cutting roll with backing means therefor operatively driven in coordination with said first cutting roll to cut from the web of cardboard successive disc-like blanks of somewhat larger size than said pads at the same rate as the production rate for pads, means for applying adhesive to marginal portions of the cardboard blanks as successively cut, means for supplying paper in an unbroken web, a third cutting roll with backing means therefor operatively driven in coordination with said second cutting roll to cut from the web of paper successive disc-like blanks of somewhat larger size than said pads at the same rate as the production rate for cardboard blanks, and means driven in coordination with said several rolls for successively permanently assembling each trimmed pad between a cardboard and a paper blank with the margins of the thus-assembled blanks projecting as an adhesive-united flange beyond a central pad-enveloping portion of the assembly.

7. A machine for making padded cushions, comprising: means for supplying resilient compressible pad material and sheet material in unbroken respective webs, means for cutting successive pads from the web of pad material, means for cutting components for successive pad envelopes from the web of sheet material at the same rate as the rate of pad production by said first-recited cutting means, and means for assembling said pads as succesively produced with components for pad envelopes as similarly successively produced, said last-recited means including means for increasing the positional spacing between successively-produced pads driven in coordination with said several cutting means to effect delivery of said pads into association with said envelope components at said increased spacing.

8. A machine for making basket cushions, comprising: means for supplying a web of excelsior batting, a first cutting roll with backing means therefor operative when driven to cut successive pads from said web of excelsior batting, means for supplying two webs of sheet material, cutting rolls with backing means operatively driven in coordination with said first cutting rolls to cut successive paired envelope components from said two webs of sheet material at the same rate per pair as the cutting rate for individual pads, and means for assembling said pads as successively produced with paired envelope components as similarly successively produced, said last-recited means including means for increasing the positional spacing between successively-produced pads, which last means is driven in coordination with said several cutting rolls to effect delivery of said pads into association with said envelope components at said increased spacing.

9. A machine for making basket cushions, comprising: means for supplying a web of excelsior batting, a first cutting roll with backing means therefor operative when driven to cut successive disc-like pads from said web of excelsior batting, means for supplying cardboard in an unbroken web, a second cutting roll with backing means operatively driven in coordination with said first cutting roll to cut from said web of cardboard successive disc-like blanks of somewhat larger size than said pads at the same rate as the rate of production of pads by said first cutting roll, means for applying adhesive to marginal portions of said cardboard blanks successively, means for supplying paper in an unbroken web, a third cutting roll with backing means operatively driven in coordination with said second cutting roll to cut from said web of paper successive disc-like blanks of somewhat larger size than said pads at the same rate as the rate of production of cardboard blanks by said second cutting roll, and means for assembling each pad as successively produced with a cardboard blank and a paper blank on opposite sides thereof and uniting said assembled blanks with said adhesive, said assembling means including means for increasing the positional spacing between successively produced pads which last means is driven in coordination with said several cutting rolls to effect delivery of said pads into association with said envelope components at said increased spacing.

10. A machine for making cushions, comprising: means for supplying cushion pads, means for supplying sheet material, means including a roller operative when driven to cut from said supplied sheet material successive pairs of envelope-forming blanks and preliminarily cup at least one of the blanks of each pair, and means driven in coordination with said third-recited means for automatically assembling the blanks of each pair about a pad and securing together the blanks of the pair.

11. Mechanism for making cupped envelope-blanks, comprising: means for supplying sheet materials in an unbroken web, a driven roller to which sheet material is supplied by said first means and having a depressed surface area, a conjugate roller driven in coordination with the first roller and having a raised surface area operative to press the supplied web into the depressed area of said first roller, and a cutting roller driven in coordination with said first roller operative to cut the web around the depressed area of said first roller.

12. In a machine for making cushions, mechanism for cutting successive pairs of envelope blanks and assembling them about successive cushion pads, said mechanism comprising: a pair of cooperating master rolls, means for driving said rolls in coordination, means for supplying a pair of webs of sheet material, one web to each of said master rolls, a pair of cutting rolls, each driven in coordination with and cooperating with one master roll and each operative to cut a succession of envelope blanks from the respective web as the web passes around the master roll, and means for successively feeding cushion pads between the master rolls while bearing the envelope blanks formed thereby, the master rolls being operative at their mutually cooperative surface zone to assemble pairs of the envelope blanks cut from both webs about the pads successively.

13. In a machine for making cushions, mechanism for cutting successive pairs of envelope blanks and assembling them about successive cushion pads, said mechanism comprising: a pair of cooperating master rolls, means for driving said rolls in coordination, means for supplying a pair of webs of sheet material, one web to each of said master rolls, a pair of cutting rolls, each driven in coordination with and cooperating with one master roll and each operative to cut a succession of envelope blanks from the respective web as the web passes around the master roll, an adhesive-applying roll cooperating with one of said master rolls and operative to apply adhesive to the envelope blank cut on that master roll, and means for successively feeding cushion pads between the master rolls while bearing the envelope blanks formed thereon, the master rolls being operative at their mutually cooperative surface zone to assemble pairs of the envelope blanks cut from both webs about the pads successively and apply sealing pressure to the assembled blanks.

14. In a machine for making cushions, mechanism for cutting successive pairs of envelope blanks and assembling them about successive cushion pads, said mechanism comprising: a pair of cooperating master rolls, means for driving said rolls in coordination, means for supplying a pair of webs of sheet material, one web to each of said master rolls, a pair of cutting rolls, each driven in coordination with and cooperating with one master roll and each operative to cut a succession of envelope blanks from the respective web as the web passes around the master roll, an adhesive-applying roll cooperating with one of said master rolls and operative to apply adhesive to the envelope blank cut on that master roll, means for successively feeding cushion pads between the master rolls while bearing the envelope blanks formed thereon, the master rolls being operative at their mutually cooperative surface zone to assemble pairs of the envelope blanks cut from both webs about the pads successively and apply sealing pressure to the assembled blanks, and means including a driven roller operative to maintain sealing pressure on the envelope blanks of the assembled cushions for a time subsequent to the assembly.

15. In a machine for making cushions, mechanism for forming successive pairs of envelope blanks and assembling them about successive cushion pads, said mechanism comprising: first and second cooperating master rolls driven in coordination, said first master roll having a depressed surface area, means for supplying a first web of sheet material to said first master roll and means for supplying a second web of sheet material to said second master roll, a cupping roll driven in coordination and cooperating with the depression in said first master roll and operative to cup therein successive areas of said first web, a first cutting roll driven in coordination and cooperating with said first master roll and operative to cut around the cupped areas of the web to form cupped envelope blanks successively, a second cutting roll driven in coordination with and cooperating with said second master roll and operative to cut successive envelope blanks from said second web, and means driven in coordination with said several rolls for feeding a succession of cushion pads between the master rolls while bearing the envelope blanks formed thereon, the master rolls being operative at their mutually cooperative surface zone to assemble each pad in a cupped envelope blank to complete and close the envelope with a blank cut on said second master roll.

JOHN H. WOODALL.